Figure 1:
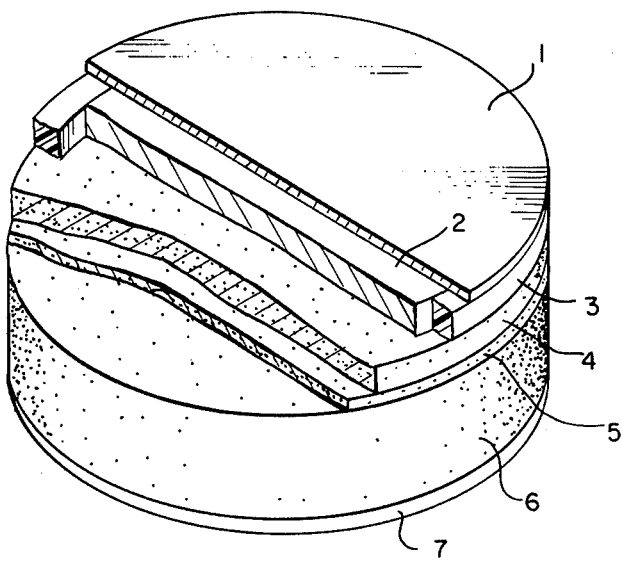

United States Patent [19]
Liang et al.

[11] 4,118,549
[45] Oct. 3, 1978

[54] SOLID STATE CELL WITH CONDUCTIVE LAYER BETWEEN ELECTRODE AND ELECTROLYTE

[75] Inventors: Charles Chi Liang, Clarence, N.Y.; AshokVenimadhav Joshi, Levittown, Pa.

[73] Assignee: P.R. Mallory & Co. Inc., Indianapolis, Ind.

[21] Appl. No.: 747,678

[22] Filed: Dec. 6, 1976

[51] Int. Cl.² .......................................... H01M 6/18
[52] U.S. Cl. .................................... 429/191; 429/218
[58] Field of Search ...................... 429/191, 218, 247

[56] References Cited

U.S. PATENT DOCUMENTS

| | | |
|---|---|---|
| 3,791,867 | 2/1974 | Broadhead et al. ............... 429/191 |
| 3,988,164 | 10/1976 | Ling et al. ........................... 429/191 |
| 4,009,052 | 2/1977 | Whittingham ...................... 429/191 |

Primary Examiner—Donald L. Walton
Attorney, Agent, or Firm—Ronald S. Cornell; Israel Nissenbaum; Charles W. Hoffmann

[57] ABSTRACT

A solid state cell separator interposed between electrode and electrolyte thereby allowing use of highly reactive materials in the electrode.

11 Claims, 2 Drawing Figures

SOLID STATE CELL WITH CONDUCTIVE LAYER BETWEEN ELECTRODE AND ELECTROLYTE

This invention relates to high energy density solid electrolyte cells using reactive electrode and electrolyte materials.

In conventional solid electrolyte cell structures the electrolyte is in intimate contact with the anode on one surface and the cathode on the other surface. Ionic transfer is effected by the use of ionic conductors such as lithium iodide or LLA electrolytes (in which lithium iodide, lithium hydroxide and aluminum oxide are combined for greater conductivity as described in U.S Pat. No. 3,713,897) which can be used in conjunction with alkali metal anodes such as lithium which is often used in such cells, and these conductors work well. However, high energy density materials (such as strong oxidizing agents including some metal and carbon fluorides and some metal oxides) are precluded from use in these cells as cathode materials because of their reactivity with the cell electrolyte, and in particular with lithium iodide. It is the same properties which make these materials highly disirable in terms of energy output that are primarily involved in making their use untenable by reason of chemical interaction with the solid electrolyte.

In the same vein, high energy density anodes such as lithium are incompatible with good ionic conductors such as $RbAg_4I_5$, and reduced rate solid state cells have resulted. The ionic conductivity of the compatible LLA electrolytes ranges only as high as $5 \times 10^{-5}$ ohm$^{-1}$ cm$^{-1}$ at room temperature whereas the conductivity of $RbAg_4I_5$ is as high as $2 \times 10^{-1}$ ohm$^{-1}$ cm$^{-1}$, at room temperature, and it is the ionic conductivity of the solid electrolyte which is determinative of the rate of discharge of cells in general and solid state cells in particular.

It is therefore an object of this invention to enable the use of high energy density materials in solid electrolyte cells with minimized chemical interactions between the solid electrolyte and the electrode materials. This objective can be attained by interposing a chemical separator or physical protective layer between the electrolyte and the reactive materials of either or both the anode or cathode.

Though separators exist in cells they are usually placed directly between the anode and cathode in order to prevent premature reaction between those two elements and the eventual shorting out of the cell by self discharge. Separators between the electrode elements are normally used in order to reduce free electrolyte flow to a negligible rate and thereby to provide nominally requisite cell internal resistance. Solid state batteries therefore do not normally have individual separators such as those in cells with solution electrolyte materials, and in effect the solid electrolyte functions as, and is usually designated as, the physical cell separator between anode and cathode. Furthermore, enhancers of ionic conductivity are usually required in order to render solid electrolyte cells operable. A separator would normally hinder this objective. The separators of the present invention therefore must have, in order to function in a positive manner, the characteristics of being chemically compatible with both the electrolyte and the electrode materials with which it is in contact and sufficient conductivity such that the ionic conductive properties of the electrolyte are not diminished to any great extent during the cell's operation. Thus, the ionic conductivity of the separators is preferably similar to that of the electrolytes. They do not, however, have to be composed of materials which are pure ionic conductors which would make them suitable as electrolytes themselves. Even mixed conductors, in which both ions and electrons are mobile, can function as the protective separator material. An ionic conductivity for the separator greater than about $1 \times 10^{-9}$ ohm$^{-1}$ cm$^{-1}$ at room temperature is required for useful utilization of solid state cells regardless of the separator's electronic conductivity. Solid electrolytes, on the other hand, cannot be electronically conductive above a minimal extent because this would allow cathode and anode to permit electron flow therebetween even under open circuit conditions thereby self discharging the cell.

Chemical compatibility between separator and electrode and between separator and electrolyte is determined by the Gibb's free energy of the couples, with a positive or zero free energy change ($\Delta G$) being indicative of no chemical interactions and therefore chemical compatibility. Examples of materials having the above mentioned ionically conductive characteristics, as well as a positive or zero $\Delta G$ when coupled with a lithium based electrolyte include transition metal chalcogenides having a layered structure such as $TiS_2$, $TiTe_2$, $VS_2$, $NbS_2$, $NbSe_2$, $NbTe_2$, $TaS_2$, $TaTe_2$, $MoSe_2$, $MoTe_2$, $WS_2$, $WSe_2$, $WTe_2$ and transition metal chalcogenides having alkali metal ions in the lattice such as $Li_xTiS_2$, $Li_xMoS_2$ ($x < 1$) etc. These compounds are suitable as the cathode protective separators in solid electrolyte cells having lithium based electrolytes and those carbon and metal halides and metal oxides which chemically react with the lithium based electrolyte, as the cathode materials. Of the halides, the fluorides are particularly reactive and normally unsuitable as cathodic materials. Examples of reactive halides include lead fluoride and carbon monofluoride. Examples of oxides reactive with lithium based electrolytes, and particularly LiI electrolytes, include lead dioxide ($PbO_2$) and manganese dioxide ($MnO_2$). In cells utilizing metal chromates including silver and copper chromates or other similarly highly oxidizing substances such as metal vanadates, molybdates and permanganates as the cathode material some metal chalcogenides might produce undesirable side reactions. Therefore other, substantially chemically unreactive nonstoichiometric compounds having as the ionic transfer basis a salt of the tungsten oxide form $(WO_3)^{-x}$ such as $Na_xWO_3$ ($x < 1$), or oxides such as tungsten oxide itself (whether stoichiometric or not) having the above requisites are capable of similarly performing the dual function of protective shield and ionic conductor.

Electrolytes such as $RbAg_4I_5$ normally react with an active metal anode and therefore these materials cannot be used in cells with each other. Separators of the present invention such as the above nonstoichiometric tungsten oxide and nonstoichiometric metal chalcogenides can function as a separator between such highly ionically conductive materials. The rate capacity of such cells is determined by the ionic conductivity of the suitable separator. Thus, though the ionic conductivity of the separator might not be as high as that of $RbAg_4I_5$, it becomes possible to form a a highly useful cell.

Though, because of its high energy density, lithium is the preferred anode material, other metals selected from Groups IA and IIA of the Periodic Table as well as aluminum can provide useful anodic materials for the solid state cells of the present invention.

Electrolytes which provide the requisite ionic conductivity for cell operation, which are compatible with the abovementioned high energy density anodes, and which are incompatible with highly oxidizing or reactive cathode materials include the abovementioned lithium iodide (and the other lithium halides such as lithium bromide and lithium chloride), lithium sulfate, and potassium and sodium hydroxide, with or without suitable dopants for increased ionic conductivity.

Highly active cathodic materials include matal oxides such as lead dioxide, manganese dioxide, metal chromates such as silver and copper chromates, metal halides as lead fluoride, metal molybdates, metal vanadates, metal permanganates, and halogens if put into solid form.

FIG. 1 is a diagrammatic, isometric stepped, partially sectional view of a solid state cell made in accordance with the invention.

In FIG. 1 the protective separator 5 is shown as being interposed between cathode layer 6 and electrolyte 4 though in other embodiments, where required, the protective separator can be placed between the anode and electrolyte. The anode 2 is surrounded by an insulating retaining ring 3, and both anode and cathode are enclosed within the cell by metallic discs 1 and 7 respectively which serve as the respective current collectors. The cylindrical wall of the cell can be formed from a heat shrinkable plastic (not shown) which will also function to hold the elements of the cell in place.

In order that the present invention may be more completely understood the following examples are given. In the examples all parts are parts by weight unless otherwise specified. The examples are set forth primarily for the purpose of illustration and any specific enumeration of detail contained therein should not be interpreted as a limitation on the case except where indicated in the appended claims.

EXAMPLE I

Figure 2:
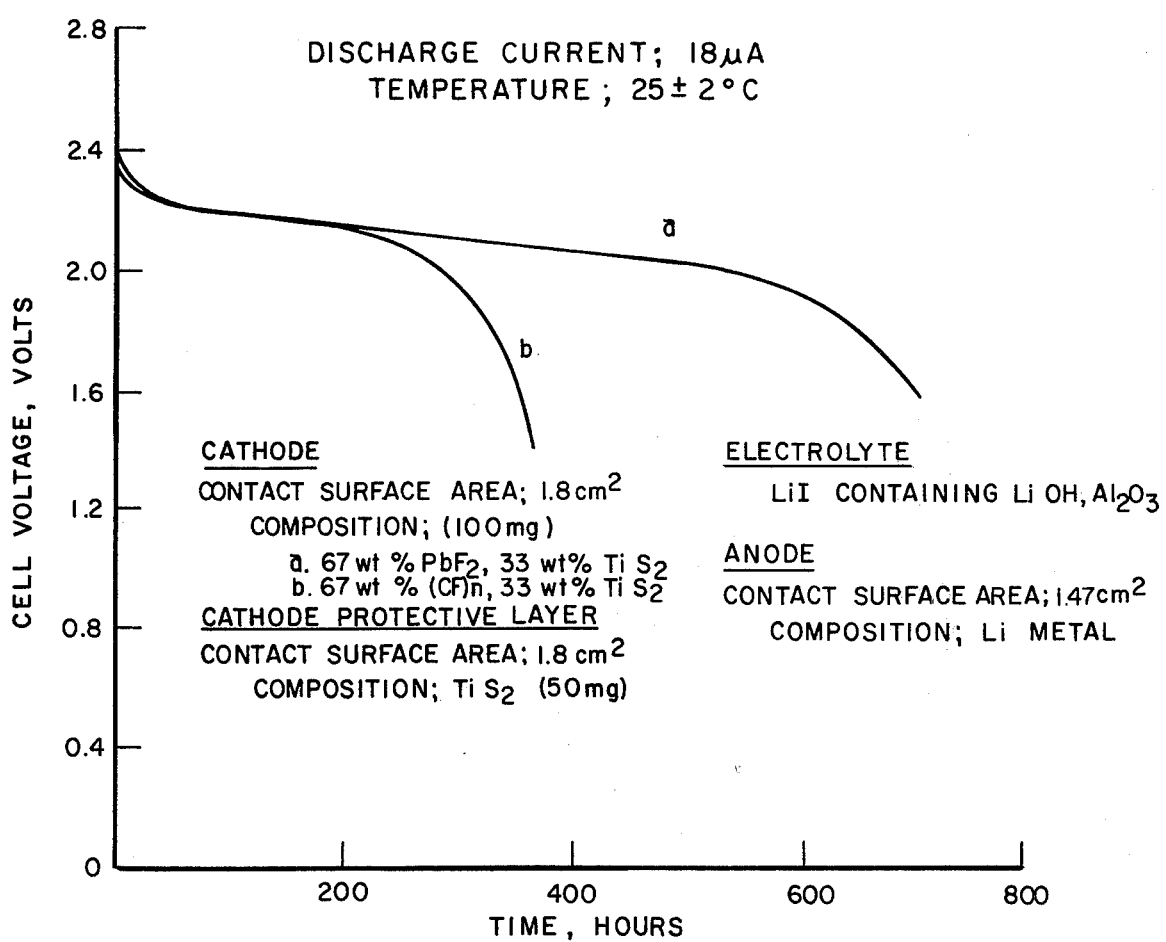

A cell having the configuration as shown in FIG. 1 constructed with an anode 2 of lithium having a contact surface area of 1.47 cm and a thickness of about 4 mils in held in position by polyropylene retaining ring 3. Stainless steel disc 1 serves as the anode current collector. An electrolyte layer 4 is composed of LiI:LiOH:Al$_2$O$_3$ in a weight ratio of 4:1:2 and has a thickness of about 8 mils and a contact surface area of about 1.8 cm$^2$. The cathode protective separator 5 has a contact surface area of about 1.8 cm$^2$ and consists of 50 mg of the layered transition metal chalcogenide TiS$_2$. A cathode 6, also having a surface area of about 1.8 cm$^2$ and weighing 100 mg, consists of about 67% by weight of lead fluoride (PbF$_2$) and 33% by weight of TiS$_2$. A titanium disc 7 serves as the cathode current collector. Both current collectors 1 and 7 are each 1 mil thick with a contact surface area of about 1.8 cm$^2$. A discharge curve taken at a current drain of 18 μA and at a temperature of about 25° C. is shown in FIG. 2 as curve a. The Li/LLA/TiS$_2$/PbF$_2$/Ti cell so constructed exhibits an open circuit voltage of about 2.7 volts.

Normally, without a separator made in accordance with this invention, the highly reactive lead fluoride electrode material would react with LiI based electrolyte material in the following manner;

$$2LiI + PbF_2 \rightarrow 2LiF + PbI_2$$

and the formation of these products decreases the rate of discharge of the cell due to the formation of the low ionically conductive products formed at the interface between cathode and electrolyte. However, the incorporation of the titanium disulfide separator prevents the side reactions from occurring and the integrity of the cell is maintained.

EXAMPLE II

A cell similar to the one described in Example I is constructed with carbon monofluoride (CF)$_n$ substituted for the lead fluoride. The open circuit voltage is determined to be about 2.7 volts with the discharge curve of the cell being shown in FIG. 2 as the curve B.

The foregoing examples are presented for the purpose of illustrating the invention and its attendant advantages. It is understood that changes and variations in the various cell constructions described in the examples can be made without departing from the scope of the present invention as defined in the following claims.

What is claimed is:

1. A solid electrochemical cell comprising a solid anode and a solid cathode as electrodes, a solid electrolyte chemically reactive with at least one of said electrodes, and a solid layer positioned between said solid electrolyte and said electrode chemically reactive therewith, said solid layer being chemically unreactive with both said solid electrolyte and said electrode which is chemically reactive with said electrolyte, and said layer having an ionic conductivity in excess of 1 × 10$^{-9}$ ohm$^{-1}$cm$^{-1}$ at room temperature.

2. The solid state cell of claim 1 wherein said layer comprises a metal chalcogenide.

3. The solid state cell of claim 1 wherein said layer comprises titanium disulfide.

4. The solid state cell of claim 1 wherein said layer comprises one or more members of the group consisting of TiS$_2$, TiTe$_2$, VS$_2$, NbS$_2$, NbSe$_2$, NbTe$_2$, TaS$_2$, TaTe$_2$, MoSe$_2$, MoTe$_2$, WS$_2$, WSe$_2$, WTe$_2$, Li$_x$MiS$_2$, Li$_x$Mos$_2$, Na$_x$WO$_3$ (x<1), and tungsten oxide.

5. The solid state cell of claim 1 wherein said anode comprises lithium.

6. The solid state cell of claim 5 wherein said electrolyte comprises a lithium salt chemically reactive with said cathode.

7. The solid state cell of claim 6 wherein said electrolyte comprises lithium iodide.

8. The solid state cell of claim 7 wherein said cathode is lead fluoride.

9. The solid state cell of claim 8 wherein said layer comprises titanium disulfide.

10. The solid state cell of claim 5 wherein said electrolyte is rubidium silver iodide with said electrolyte being reactive with said lithium anode.

11. The solid state cell of claim 10 wherein said layer comprises tungsten oxide or a nonstoichiometric salt having a (WO$_3$)$^{-x}$ anion wherein x is less than 1 and said layer is positioned between said lithium and said rubidium silver iodide.

* * * * *